(12) United States Patent
Chen et al.

(10) Patent No.: US 6,993,618 B2
(45) Date of Patent: Jan. 31, 2006

(54) DUAL-MODE FLASH STORAGE EXCHANGER THAT TRANSFERS FLASH-CARD DATA TO A REMOVABLE USB FLASH KEY-DRIVE WITH OR WITHOUT A PC HOST

(75) Inventors: Ben Wei Chen, Fremont, CA (US); Tzu-Yih Chu, San Jose, CA (US); Sun-Teck See, San Jose, CA (US)

(73) Assignee: Super Talent Electronics, Inc., San Jose, CA (US)

( * ) Notice: Subject to any disclaimer, the term of this patent is extended or adjusted under 35 U.S.C. 154(b) by 197 days.

(21) Appl. No.: 10/707,835

(22) Filed: Jan. 15, 2004

(65) Prior Publication Data

US 2005/0160223 A1 Jul. 21, 2005

(51) Int. Cl.
*G06F 13/00* (2006.01)
*G06F 1/16* (2006.01)

(52) U.S. Cl. ........................ 710/305; 710/301; 711/115
(58) Field of Classification Search ................ 710/305, 710/1, 315, 313, 14, 11, 63, 100, 301, 303, 710/74, 310, 52; 711/115, 103, 154, 104; 713/100; 370/431, 465, 912; 709/253; 361/737, 361/748, 684; 439/55, 527
See application file for complete search history.

(56) References Cited

U.S. PATENT DOCUMENTS

| | | | | |
|---|---|---|---|---|
| 5,773,332 | A | | 6/1998 | Glad ........................... 361/737 |
| 6,055,464 | A | * | 4/2000 | Nagano ....................... 700/295 |
| 6,122,694 | A | * | 9/2000 | Horiguchi ................... 710/110 |
| 6,372,974 | B1 | | 4/2002 | Gross et al. ................... 84/609 |
| 6,438,638 | B1 | | 8/2002 | Jones et al. .................. 710/301 |
| 6,463,362 | B1 | * | 10/2002 | Nagano ....................... 700/295 |
| 6,505,263 | B1 | * | 1/2003 | Larson et al. ................ 710/100 |
| 6,567,273 | B1 | | 5/2003 | Liu et al. ...................... 361/737 |
| 6,813,650 | B1 | * | 11/2004 | Cato et al. ..................... 710/14 |
| 6,820,160 | B1 | * | 11/2004 | Allman ........................ 710/305 |
| 2003/0079077 | A1 | | 4/2003 | Piau et al. .................... 711/103 |
| 2003/0093606 | A1 | | 5/2003 | Mambakkam et al. ....... 710/305 |
| 2003/0145141 | A1 | | 7/2003 | Chen et al. .................... 710/74 |

OTHER PUBLICATIONS

"Implementation of the USB interface in the instrumentation for sound and vibration measurement and analysis" by Podgorski et al. (abstract only) Publication Date: 2003.*

* cited by examiner

*Primary Examiner*—Gopal C. Ray
(74) *Attorney, Agent, or Firm*—Stuart T. Auvinen

(57) ABSTRACT

A flash-card exchanger has two modes of operation. When a host personal computer (PC) is connected to a Universal-Serial-Bus (USB) connector, the flash-card exchanger operates in a card reader mode, allowing the host to read data from removable flash-memory cards inserted into connector slots of the flash-card exchanger. When the host PC is not connected, a USB flash-memory thumb or key-chain drive can be inserted into a second USB connector. A USB dual-mode microcontroller acts as a USB host, reading data from the removable flash-memory card and writing the data to the USB-memory key drive using USB packets. Since the USB-memory key drive is small and removable, the user can upgrade to larger storage capacities by plugging in a larger-capacity USB-memory key drive. A flash-exchanger program executing on the USB dual-mode microcontroller copies data from an input-output bus and generates USB packets to the USB-memory key drive.

20 Claims, 7 Drawing Sheets

DUAL-MODE FLASH STORAGE EXCHANGER THAT TRANSFERS FLASH-CARD DATA TO A REMOVABLE USB FLASH KEY-DRIVE WITH OR WITHOUT A PC HOST

BACKGROUND OF INVENTION

This invention relates to flash-memory-card readers, and more particularly to data exchangers.

Consumer devices such as digital cameras and personal digital assistants (PDAs) often use removable flash memory. The removable flash memory is in the form of a small card in a standardized form factor such as compact flash (CF), secure digital (SD), multimedia card (MMC), or Sony's Memory Stick.

Flash memory has gained wide acceptance for its non-volatile storage, which is ideal for portable devices that may lose power, since the data is not lost when stored in the flash memory. Flash memories are constructed from electrically-erasable programmable read-only memory (EEPROM) cells.

Rather than using a randomly-addressable scheme such as is common with dynamic-random-access memory (DRAM), many flash memories use a block-based addressing where a command and an address are sent over the data bus and then a block of data is read or written. Since the data bus is also use to send commands and addresses, fewer pins are needed on the flash-memory chip, reducing cost. Thus flash memory is often used as a mass-storage device rather than a randomly-addressable device.

Universal-Serial-Bus (USB) has become a popular standard interface for connecting peripherals to a host such as a personal computer (PC). USB-based flash-memory storage devices or "drives" have been developed to transport data from one host to another, replacing floppy disks. While large external flash drives may be used, smaller USB flash drives known as key-chain or key drives have been a rapidly growing market.

Flash-card readers are sometimes used to transfer digital data, such as digital picture files, from the removable flash card to a PC. The flash-memory card can be removed from the digital camera and inserted into a slot on the flash-card reader. The user can then copy the digital-picture files to the PC using the flash-card reader.

FIG. 1 shows a prior-art flash-card reader. Card reader 35 is a peripheral device that can be attached to host PC 10 using a serial bus such as a USB. For example, card reader 35 may be contained in a small box and attached to host PC 10 by a USB cable that plugs into USB connector 12 on card reader 35 and into another USB plug on host PC 10. Card reader 35 could also be located inside host PC 10 or inside another device, such as inside a printer. Optional battery or power adapter 14 can be used to supply power.

Serial packets from host PC 10 are transferred through USB connector 12 to USB peripheral controller 15 in card reader 35. USB peripheral controller 15 decodes commands and addresses in the USB packets and performs requested operations. For example, host PC 10 can send USB packets requesting to read data on compact-flash card 22 that is inserted into a slot in card reader 35. USB peripheral controller 15 activates compact-flash interface 20 to read data from compact-flash card 22.

Several slots for several different kinds of flash cards may be present on card reader 35, although some card readers have only one type of slot. For example, a different size slot can accept smart-media flash-card 26, while another slot accepts secure-digital/multi-media card 32, and another accepts memory stick 36.

USB peripheral controller 15 can receive interrupts from one of flash interfaces 20, 24, 28, 24 when one of compact-flash card 22, smart-media flash-card 26, secure-digital/multi-media card 32, or memory stick 36, respectively, is inserted into a slot and pushed into an electrical connector in the slot. USB peripheral controller 15 can read configuration information from the newly-inserted flash card and then send a USB packet to host PC 10. Alternately, host PC 10 can periodically search for inserted flash cards by attempting to read from each of compact-flash card 22, smart-media flash-card 26, secure-digital/multi-media card 32, and memory stick 36. When the flash cards are not inserted, the reading fails.

Card reader 35 acts as a USB peripheral, while host PC 10 acts as the USB host. The USB host sends request packets to the USB peripheral, and the USB peripheral responds to these requests, such as by reading data. Special mass-storage class software running on host PC 10 schedules USB transactions to one or more USB peripherals. Many USB peripherals can be accessed when USB hubs are used, either on host PC 10 or externally.

While card reader 35 is useful, it requires host PC 10 for operation, since USB peripheral controller 15 can only respond to USB commands from host PC 10. USB peripheral controller 15 acts as a USB endpoint, merely responding to commands from the upstream USB host on the PC. When host PC 10 is not connected, card reader 35 is not able to read flash-memory cards. card reader 35 lacks USB host intelligence since it is a USB peripheral.

Sometimes a user is not near host PC 10 and yet desired to transfer digital files from a flash-memory card to a storage media. For example, a tourist may take many digital photos and fill his flash-memory card. The tourist could take along additional flash-memory cards, or find an Internet cafe and download the digital pictures from the flash card to a recordable optical disk or to the Internet, but the Internet cafe may not have a flash-card reader.

Portable flash-card readers have been developed to solve this problem. These portable flash-card readers may contain a small hard disk, allowing the user to transfer digital picture files from a removable flash-memory card to the hard disk. Later the portable flash-card reader may be connected to a PC and the digital picture files transferred from the small hard disk to the PC. Unfortunately, the small hard drive on the portable flash-card reader may fail after experiencing shock and have reliability problems.

The portable flash-card reader may be equipped with an internal, built-in flash memory rather than the small hard drive to alleviate reliability problems. However, the portable flash-card reader may become outdated as digital-photo sizes increase, since the amount of internal flash memory is fixed. It would be better to have an expandable amount of flash memory.

What is desired is a portable flash-card reader that has an expandable amount of flash memory. A flash-card exchanger that can transfer digital files from a removable flash-memory card to an expandable and removable flash memory is desired. A flash-card exchanger that can perform the transfer to the expandable flash memory without a host PC is desirable. A flash card reader that can operate as a USB peripheral when connected to a PC, but can also act as a USB host when not connected to a PC is desired.

DETAILED DESCRIPTION

The present invention relates to an improvement in flash-memory-card readers. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have realized that a self-contained flash-card exchanger can have an expandable memory capacity when a USB-memory key drive is used. The USB key drive contains flash memory and has a USB connector that can be plugged into the flash-card exchanger. The user can simply plug in a higher-capacity USB-memory key drive to increase memory. The flash-card exchanger has two USB plugs—one for connecting to the host PC, and a second for the USB key drive to plug into.

The USB controller inside the flash-card exchanger is modified to support a USB host mode as well as the normal USB peripheral mode. Special intelligence and controllers for the USB host mode allow data to be transferred from the flash-memory card to the USB-memory key drive when the host PC is not connected.

Figure 1:
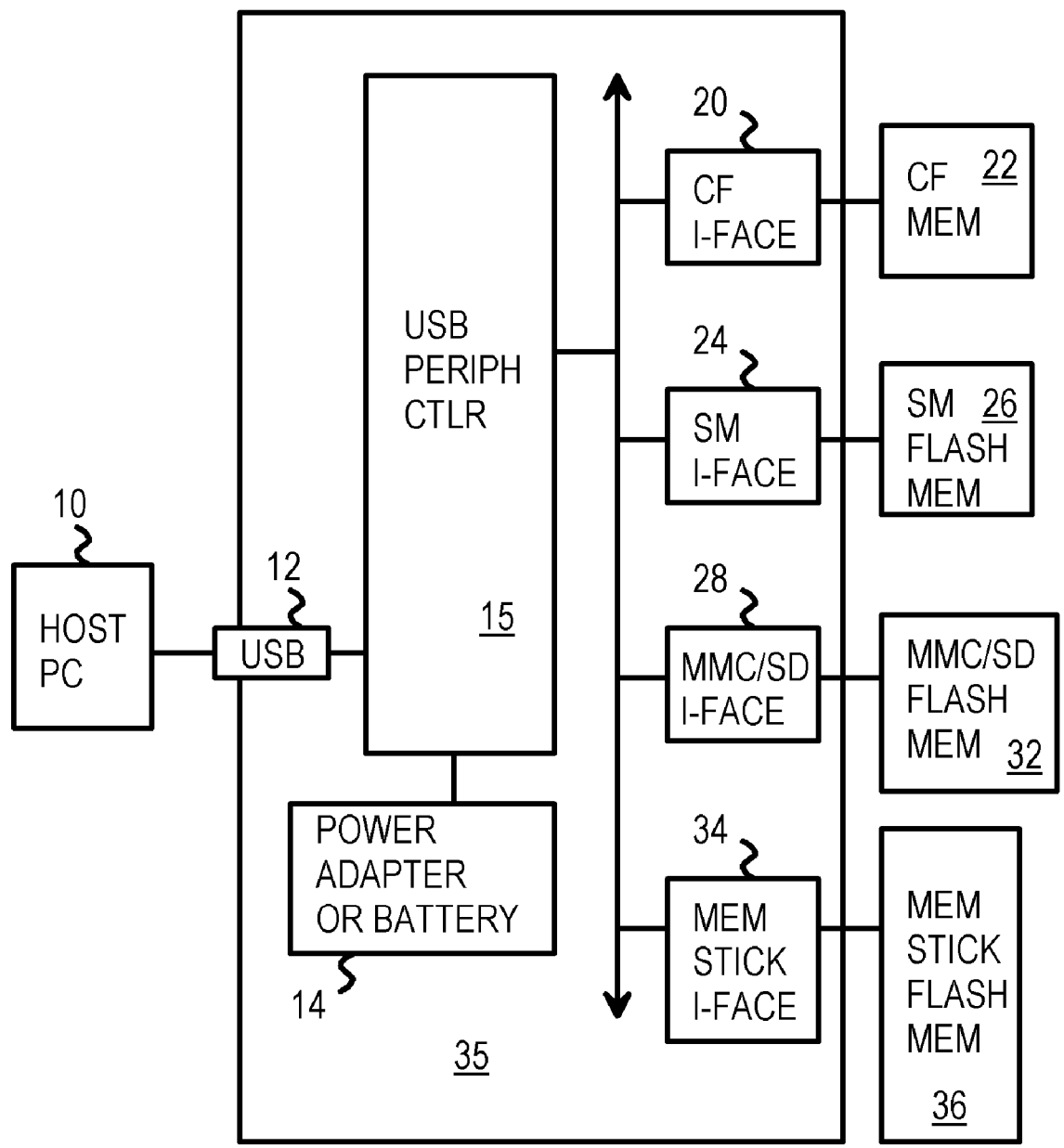
FIG. 1 shows a prior-art flash-card reader.
Figure 2:
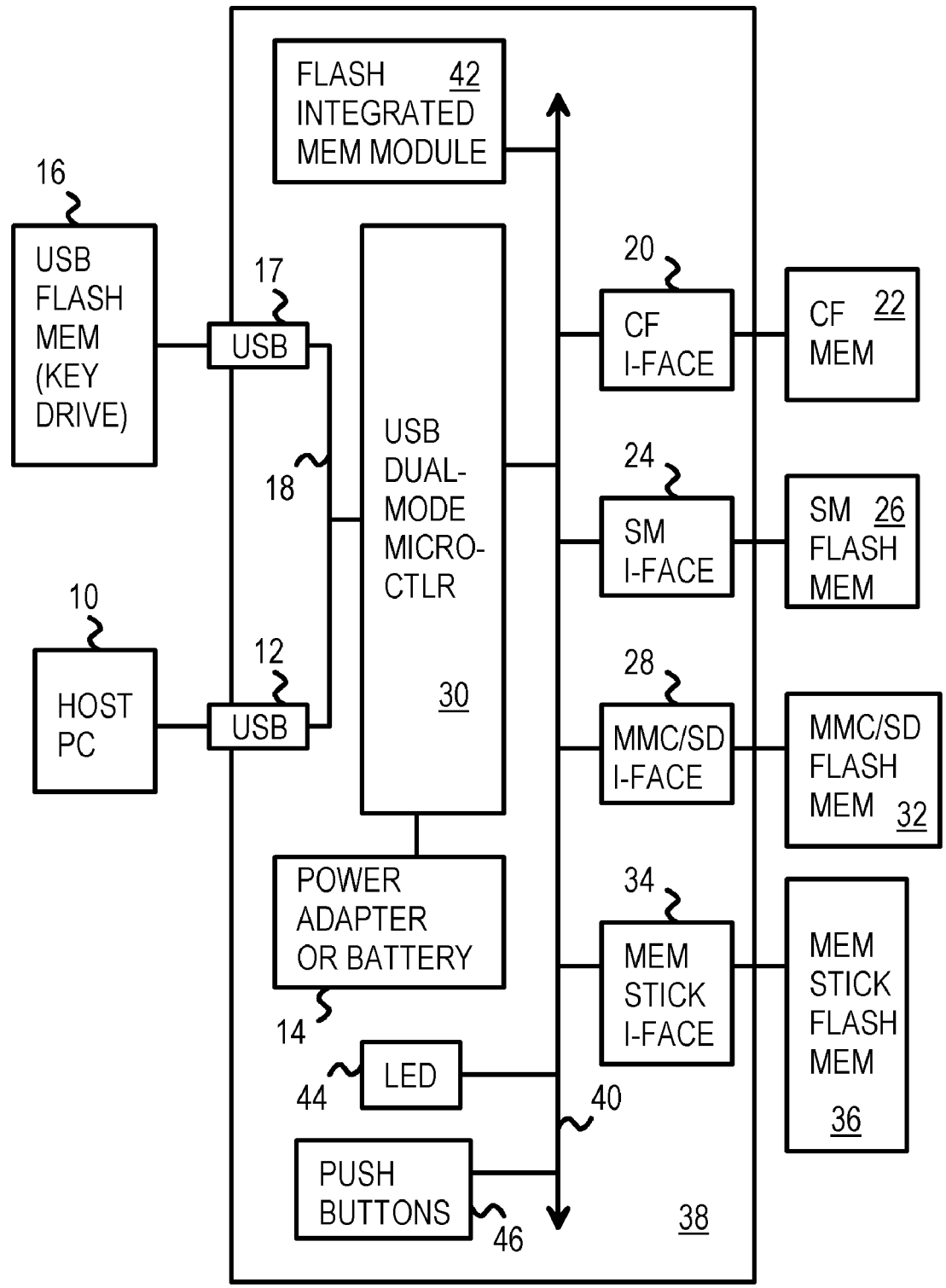
FIG. 2 shows a flash-card exchanger having two USB connectors.

FIG. 2 shows a flash-card exchanger having two USB connectors. USB dual-mode microcontroller 30 can operate as a USB peripheral controller (slave) or as a USB host controller (master). USB bus 18 is the upstream USB bus segment when host PC 10 is connected through USB connector 12, but acts as a downstream USB bus segment when host PC 10 is not connected. When USB-memory key drive 16 is plugged into USB connector 17, USB dual-mode microcontroller 30 can send USB packets downstream over USB bus 18.

I/O bus 40 connects USB dual-mode microcontroller 30 to compact-flash interface 20, to smart-media interface 24, to secure-digital/multi-media interface 28, and to memory stick interface 34. Interfaces 20, 24, 28, 34 can each include an electrical connector that makes electrical connection with a properly-inserted flash card, and other components such as registers, buffers, and glue logic. One or more of interfaces 20, 24, 28, 34 may exist on a particular embodiment of flash-card exchanger 38. For example, a basic flash-card exchanger 38 may have only one slot for memory stick 36 and have only memory stick interface 34, while a more deluxe embodiment may have four slots and all four interfaces.

Usually only one of compact-flash card 22, smart-media flash-card 26, secure-digital/multi-media card 32, and memory stick interface 34 is plugged in at a time. When host PC 10 is connected, USB dual-mode microcontroller 30 acts as a USB peripheral, allowing host PC 10 to read or write data in the inserted flash card. For example, when compact-flash card 22 is inserted, host PC 10 can send USB packets with commands for USB dual-mode microcontroller 30 to read data from compact-flash card 22 through compact-flash interface 20. After the data is read, host PC 10 can send a command to erase the data in compact-flash card 22. USB dual-mode microcontroller 30 generates the lower-level flash-memory commands to perform the erase operation, sending a starting address and a length of the block to erase to compact-flash card 22, and then waiting for completion of the erase operation before sending a reply or completion packet back to host PC 10.

When host PC 10 is not connected, USB dual-mode microcontroller 30 acts as a USB host. The user can plug USB-memory key drive 16 into USB connector 17. When compact-flash card 22 is inserted, USB dual-mode microcontroller 30 acts as the USB host and generates the mass-storage class flash-memory commands to perform a read operation, sending a starting address and a length of the block to read from compact-flash card 22. Then USB packets with the data and a write request are generated by USB dual-mode microcontroller 30 and sent over USB bus 18 to USB-memory key drive 16. USB-memory key drive 16 writes the data to its flash memory and replies with a completion packet to USB dual-mode microcontroller 30. USB dual-mode microcontroller 30 can break the data up into several USB transactions if necessary.

USB dual-mode microcontroller 30 can operate in USB host mode or in USB peripheral mode, depending on whether host PC 10 is connected. USB dual-mode microcontroller 30 can contain firmware that performs USB host operations according to the USB "On-The-Go" specification, and can perform just a subset of USB host operations.

Some internal memory may also be used for data transfers. For example, flash-integrated memory module 42 may be built-in to flash-card exchanger 38 and connect to I/O bus 40. USB dual-mode microcontroller 30 may transfer data from compact-flash card 22 to flash-integrated memory module 42 when host PC 10 and USB-memory key drive 16 are not connected.

USB dual-mode microcontroller 30 can receive commands from the user who pushes buttons 46, which are read over I/O bus 40. The user can select the transfer direction (read or write) and can start the operation with buttons 46. The status of the transfer operation can be reported to the user through light-emitting diodes (LEDs) 44, which are also drive over I/O bus 40 by USB dual-mode microcontroller 30. Registers between I/O bus 40 and LEDs 44 can be added to store the display data.

Battery or power adapter 14 can include an internal battery and an external AC/DC adapter to provide power to USB dual-mode microcontroller 30 and other components.

Figure 3:
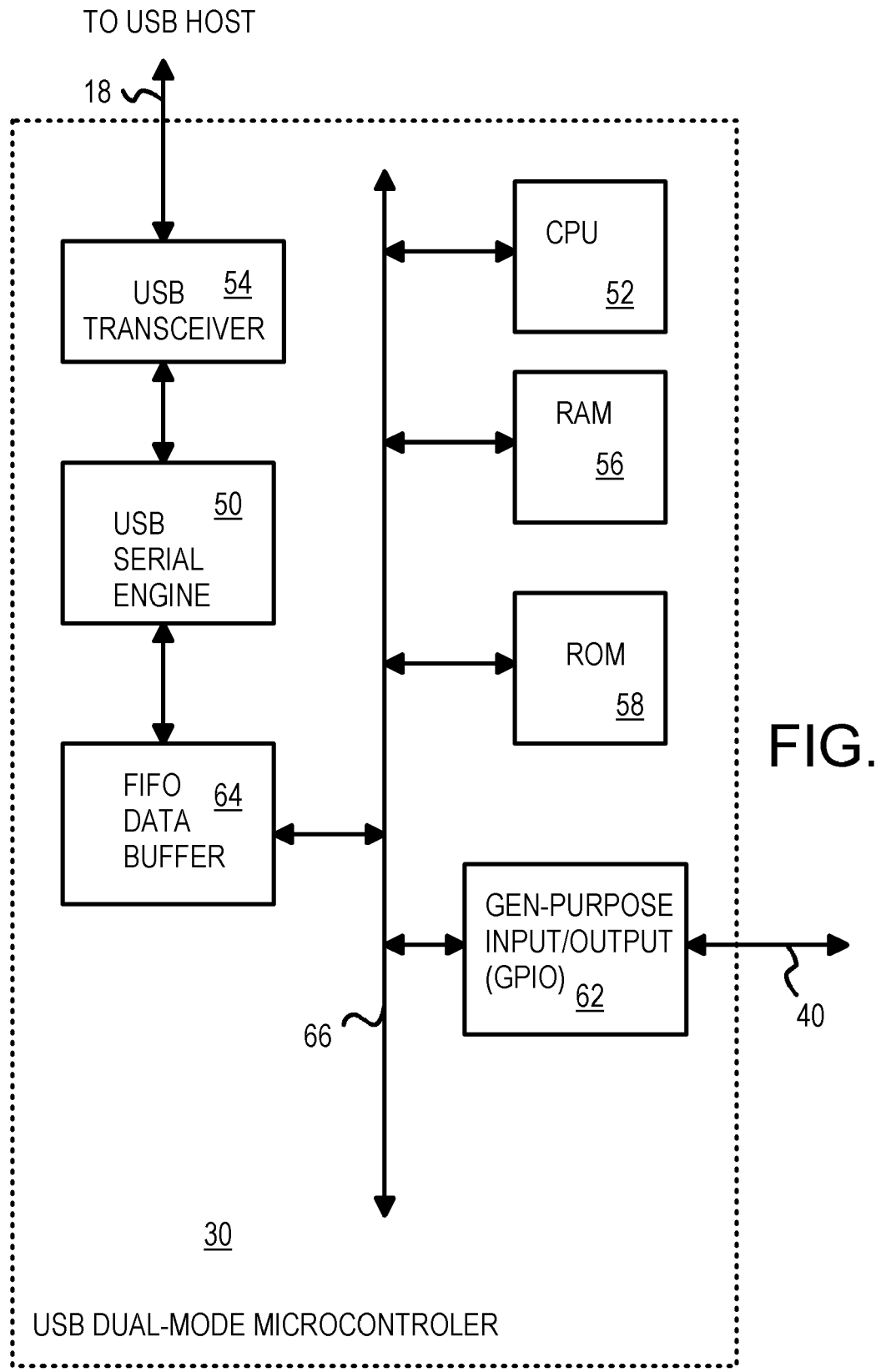
FIG. 3 is a block diagram of the USB dual-mode microcontroller.

FIG. 3 is a block diagram of the USB dual-mode microcontroller. Internal bus 66 connects CPU 52 with RAM 56, serial-data buffer 64, and general-purpose input-output GPIO 62. CPU 52 executes instructions from RAM 56, such as to transfer data between serial-data buffer 64 and GPIO 62. CPU 52 can operate on or modify the data by reading the data over bus 66. RAM 56 can store instructions for execution by the CPU and data operated on by the CPU.

Serial transceiver 54 connects to the differential data lines D+, D− of USB bus 18 and contains both a differential receiver and a differential transmitter. Data is encoded or decoded using NRZI encoding. Bit stuffing can be used to align data. An interrupt to CPU 52 can be generated when a start-of-packet sequence is detected on USB bus 18. CPU 52 can then execute a routine to handle the interrupt and process the new packet.

Serial engine 50 can perform higher-level functions such as checking cyclical-redundancy-check (CRC) checksums, locating packet identifiers, end-of-packet markers, higher-level frame markers, and converting serial data to parallel data words. The transmit and receive data is stored in serial-data buffer 64. Commands and addresses from the USB packets can also be stored in serial-data buffer 64, but are read by CPU 52 to determine what operation to perform.

GPIO 62 reads and writes data to I/O bus 40. Data from the compact-flash card can be read by sending flash-memory commands and addresses over I/O bus 40 in a sequence recognized by the compact-flash card, and then reading the flash data placed on I/O bus 40 by the compact-flash interface. The push buttons can generate an interrupt or be periodically polled through GPIO 62, and data to drive the LED's can be output by GPIO 62 over I/O bus 40.

When operating in USB host mode, serial engine 50 can generate packet fields and frame markers for outgoing USB packets to USB-memory key drive. Start-of-packet sequences and checksums can be generated by serial engine 50 or by serial transceiver 54.

Figure 4A:
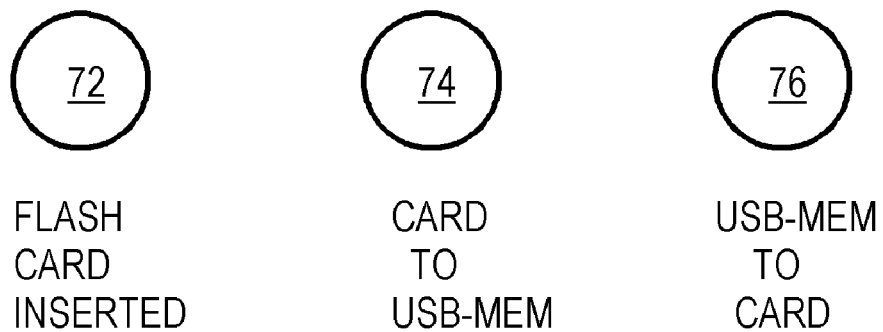
FIGS. 4A–B show LED displays on the flash-card exchanger.
Figure 4B:
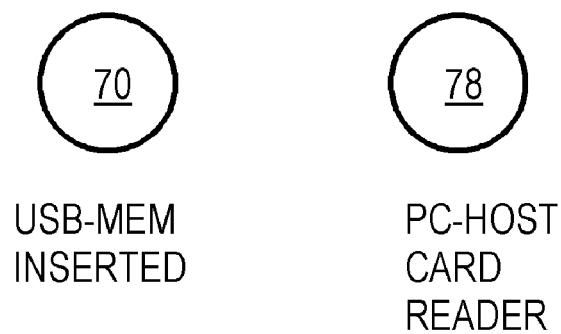

FIGS. 4A–B show LED displays on the flash-card exchanger. A simple embodiment is show, but other arrangements are possible. In FIG. 4A, three LEDs' show the flash-card status and transfer direction. LED 72 is lit green when one of the removable flash cards is properly inserted into one of the slots on flash-card exchanger. LED 72 can flash red when two or more flash-memory cards are inserted into the slots, or when a card is not fully seated in the connector.

When the user selects the READ direction of data transfer, LED 74 is lit to indicate that the transfer direction is from the flash card to USB-memory key drive 16. When the user selects the WRITE direction of data transfer, LED 76 is lit to indicate that the transfer direction is from USB-memory key drive 16 to the flash card.

In FIG. 4B, two LEDs show the operating mode of the flash-card exchanger. When host PC 10 is connected, flash-card exchanger 38 acts as a flash-card reader in the USB peripheral mode, and LED 78 is lit. When host PC 10 is not connected, LED 78 is dark. However, if USB-memory key drive 16 is inserted and host PC 10 is not, LED 76 is lit. Data can then be transferred to or from USB-memory key drive 16 while flash-card exchanger 38 operates in USB host mode as a data exchanger rather than just a card reader.

Figure 5:
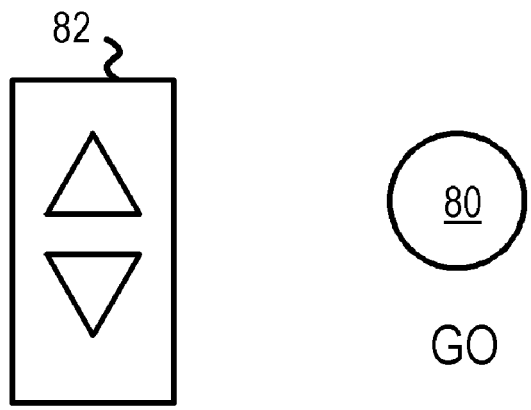
FIG. 5 shows user-control buttons on the flash-card exchanger.

FIG. 5 shows user-control buttons on the flash-card exchanger. Select buttons 82 contain an up and a down button that can be pressed to change the direction of data transfer. For example, pressing the up button once can select READ mode, where data is read from the removable flash-memory card and written to USB-memory key drive 16. Pressing the down button once or the up button twice can select the WRITE mode, where data is written to the flash-memory card. Alternately, select button 82 could be a single button that toggles the selected direction.

Pressing GO button 80 causes the data transfer to begin. The lit LEDs can be made to flash or blink during the data transfer operation to let the user know that the operation is still in progress. Once the data transfer completes, the LEDs can stop flashing, letting the user know that it is OK to remove the flash-memory card and USB-memory key drive 16.

Figure 6:
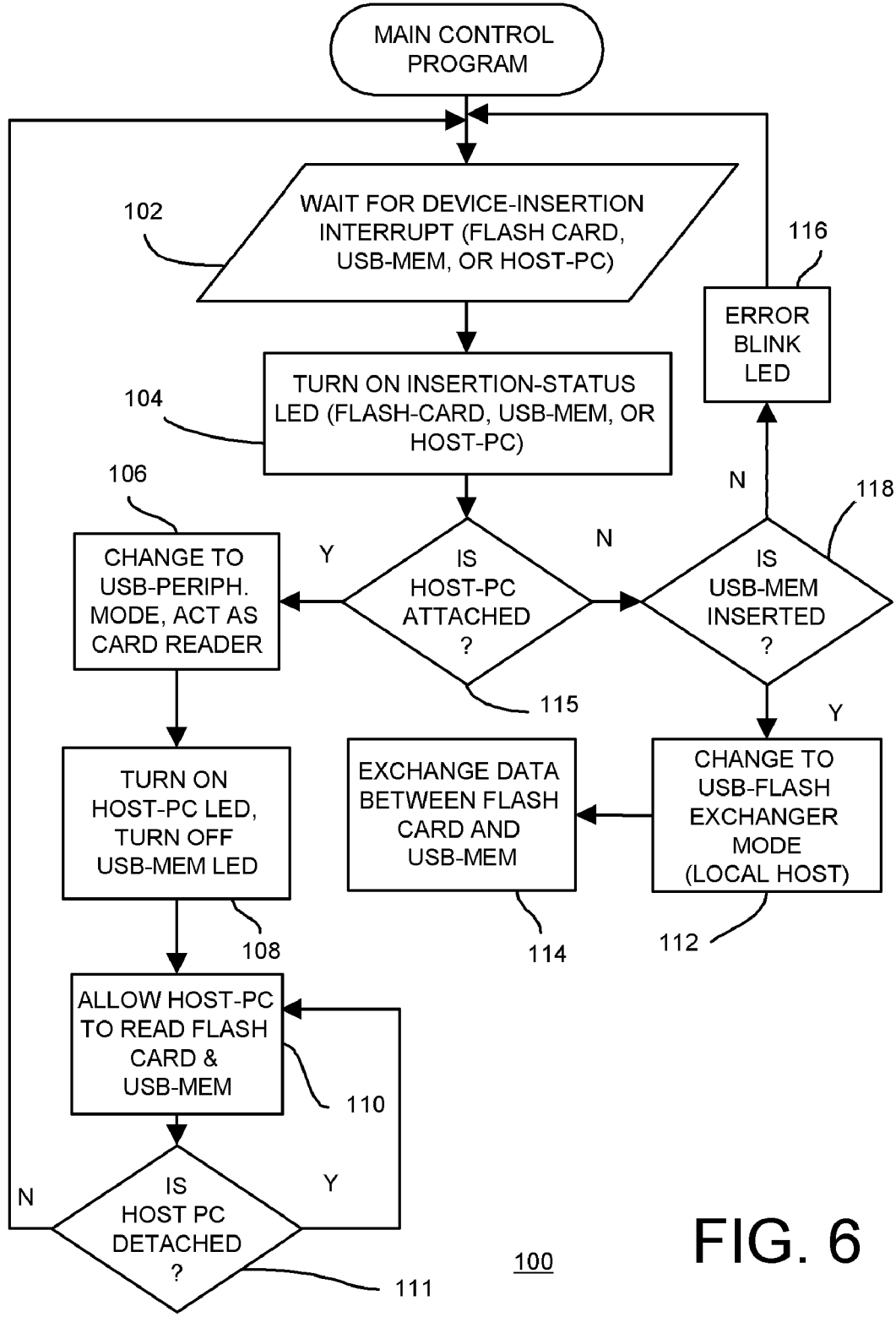
FIG. 6 is a flowchart of the main control program executed by the USB dual-mode microcontroller.

FIG. 6 is a flowchart of the main control program executed by the USB dual-mode microcontroller. Main control program 100 runs on the CPU in USB dual-mode microcontroller 30. Control program 100 can have subroutines that poll each of interfaces 20, 24, 28, 34 to detect when a flash-memory card is inserted, and to poll USB bus 18 to detect when USB-memory key drive 16 or host PC 10 is connected. Hardware interrupt logic can also be used.

Main control program 100 waits for an interrupt to be generated from insertion of a flash card, USB-memory key drive, or connection to a host PC, step 102. When a new connection is detected, an insertion-status LED is lit, step 104. For example, when a flash card is inserted, LED 72 is lit, and when USB-memory key drive 16 is inserted, LED 70 is lit. When the host PC is connected, LED 78 is lit.

When the host PC is connected, step 115, then USB dual-mode microcontroller 30 operates in USB peripheral mode. Flash-card exchanger 38 acts as a flash-card reader, responding to commands from the host PC, step 106. The USB-memory key LED is turned off, even if USB-memory key drive 16 is inserted, and the host PC LED remains on, step 108. The host PC can read any inserted flash-memory cards, step 110, by sending USB packets to flash-card exchanger 38, which acts as a USB peripheral. Main control program 100 can return to step 102 waiting for the next insertion once transfer is complete. When the program detects that the host PC is detached, step 111, then the main control program can re-start or return to initial conditions at step 102.

When the host PC is not connected, step 115, and USB-memory key drive 16 is connected, step 118, then data can be transferred to USB-memory key drive 16 rather than to the host PC. USB dual-mode microcontroller 30 enters a local-host mode, step 112, and acts as a flash-card exchanger rather than a dumb card reader. Data can be exchanged between an inserted flash card and USB-memory key drive 16 using USB dual-mode microcontroller 30 as the USB host, step 114. Main control program 100 can return to step 102 waiting for the next insertion once transfer is complete. Once an insertion action is complete, the control program queries the user for further action by blinking the corresponding LED, until GO 80 button is pressed. If a new flash card needs to transfer the data, the old one can be removed. The user interface cycle starts all over again by waiting for the next insertion.

When the host PC is not connected, step 115, and USB-memory key drive 16 is also not connected, step 118, then data cannot be transferred. An error is signaled by blinking the USB-memory key LED. The LED can blink red or yellow rather than green to indicate the error. If flash-integrated memory module 42 is present, transfer could occur to the internal flash-integrated memory module using the local host mode (not shown).

Figure 7A:
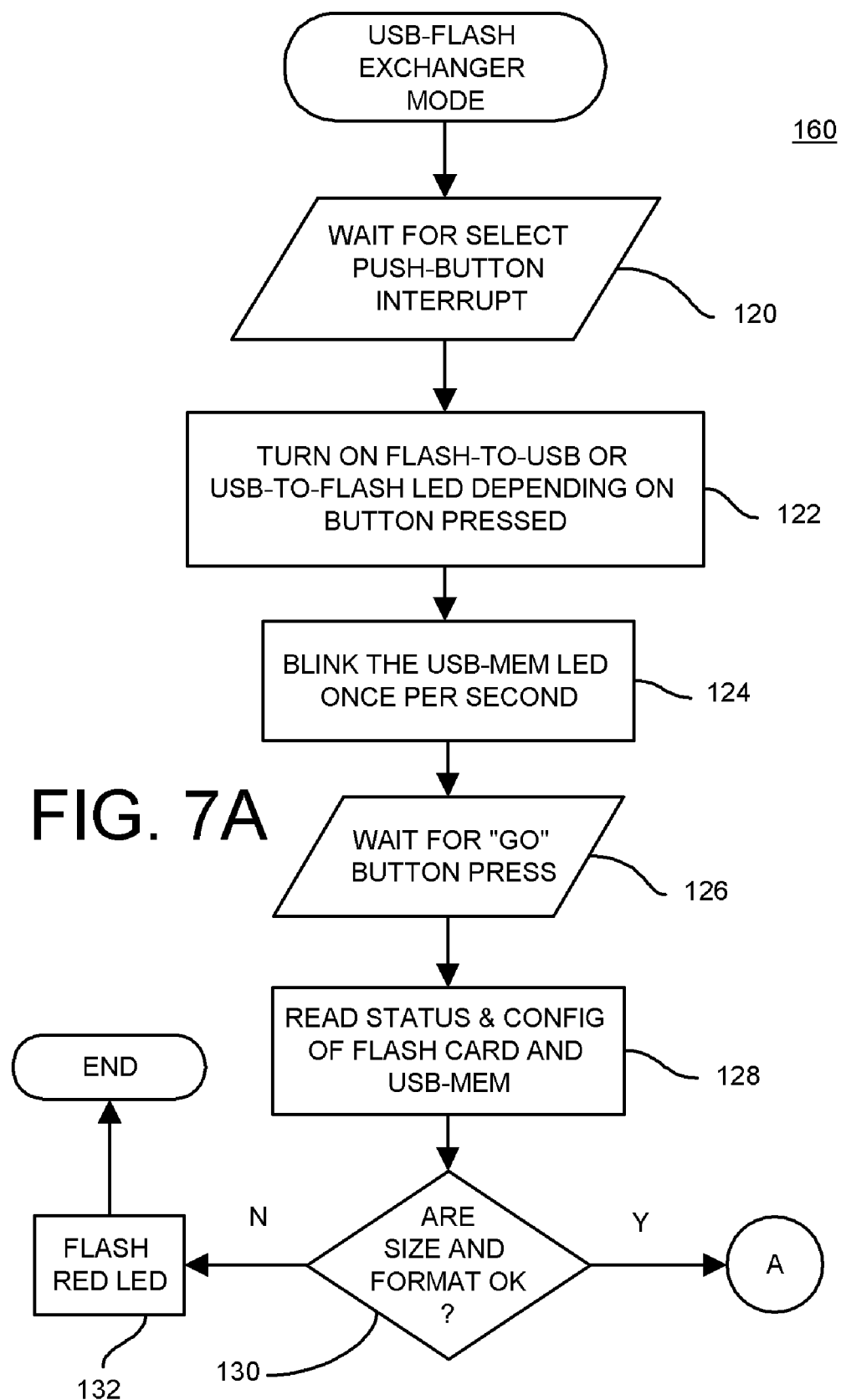
FIGS. 7A–B show operation in a flash-card exchanger mode.
Figure 7B:
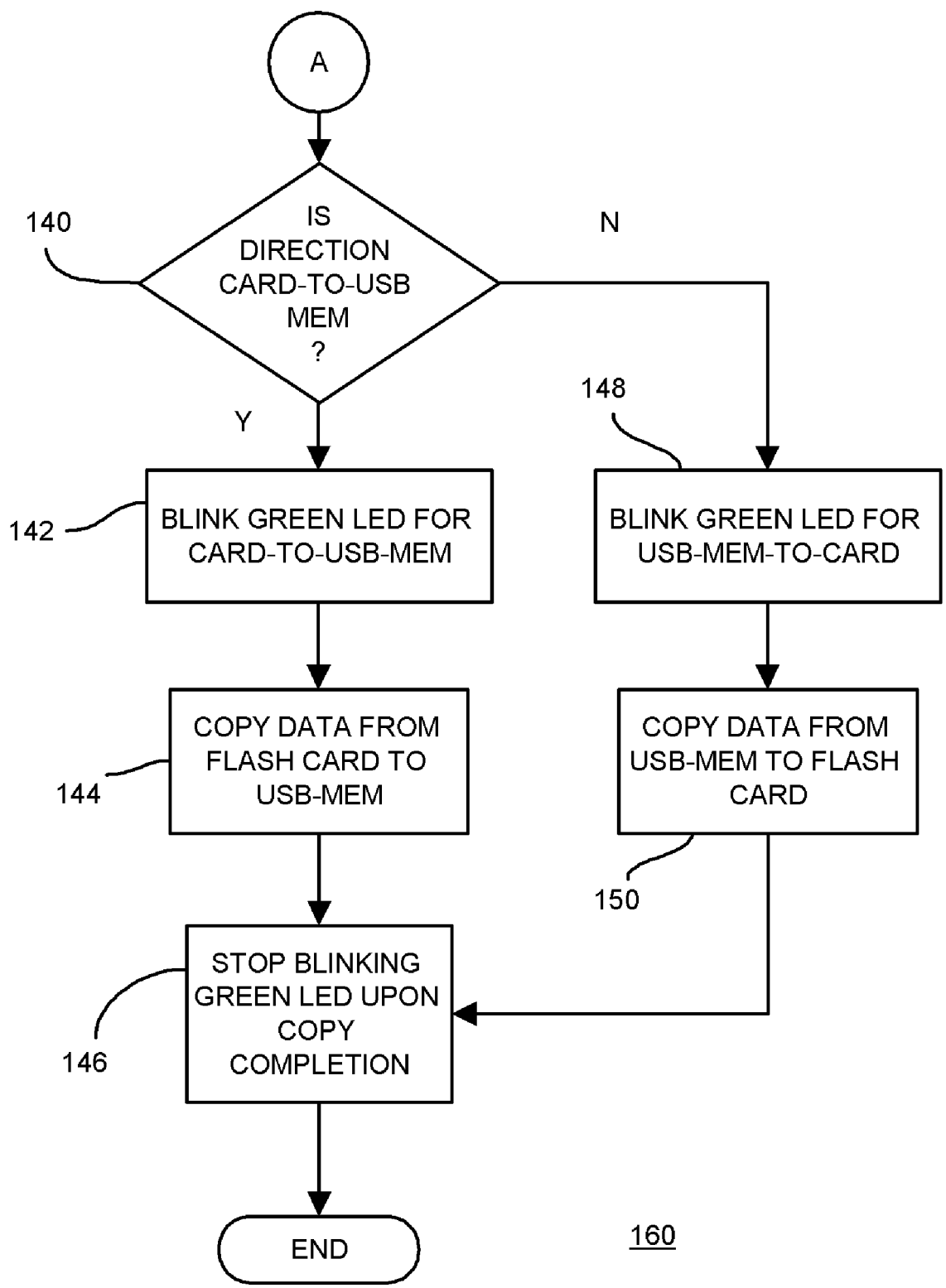

FIGS. 7A–B show operation in a flash-card exchanger mode. When main control program 100 enters the local host mode, data is transferred using flash-exchanger program 160 that executes on USB dual-mode microcontroller 30. In FIG. 7A, when the local host or flash-exchanger mode is entered by main control program 100, flash-exchanger program 160 is activated. The push buttons are polled to detect a key press, step 120, or the program waits for a key-press interrupt. When one of the select (direction) keys is pressed, the direction selected determines which of LEDs 74, 76 is lit, step 122. When the selected direction is flash-card to USB-memory key drive (READ direction), then LED 74 is lit. When the selected direction is USB-memory key drive to flash-card (WRITE direction), then LED 76 is lit.

The USB-memory LED 70 is turned on and off periodically, such as once per second, step 124, to indicate that the data transfer is ready to begin. Once the user pressed the GO button, step 126, the status and configuration of the inserted flash card and USB-memory key drive 16 can be read from the devices, step 128. A memory area or a register on the flash devices can be defined as containing the status and memory configuration, size, etc.

If there is some error indicated by the status register, or if the memory configurations are incompatible, step 130, then an error occurs. One of the LEDs, such as LED 70, is flashed red, step 132, to indicate a fatal error. For example, the status could indicate that the memory is faulty, or that the device to be written to is read-only. The target device may have insufficient memory to receive the data, or the read data may be protected, requiring authentification of the user's privilege.

In FIG. 7B, when the status and configurations are OK and compatible, the data transfer can occur. When the selected transfer direction is from the flash-card to the USB-memory key drive (READ direction), step 140, then direction LED 74 is blinked green to indicate that the transfer is in progress, step 142. USB-memory LED 70 is already blinking green. The data is then read from the flash card using flash commands transferred over I/O bus 40 that are generated by USB dual-mode microcontroller 30. This data is written from USB dual-mode microcontroller 30 to USB-memory key drive 16 over USB bus 18 by USB packets that are generated by USB dual-mode microcontroller 30 operating in the USB host mode. Once all data is copied, step 144, then the blinking of direction LED 74 stops, step 146, and direction LED 74 can remain green for a successful transfer, or red for a failure of some kind, such as the user removing the flash card too soon.

When the selected transfer direction is from the USB-memory key drive to the flash-card (WRITE direction), step 140, then direction LED 76 is blinked green to indicate that the transfer is in progress in the reverse direction, step 148. USB-memory LED 70 is already blinking green. The data is then read from USB-memory key drive 16 over USB bus 18 using USB packets that are generated by USB dual-mode microcontroller 30 operating in the USB host mode. This data is then written from USB dual-mode microcontroller 30 to the flash card using flash commands transferred over I/O bus 40 that are generated by USB dual-mode microcontroller 30. Once all data is copied, step 150, then the blinking of direction LED 76 stops, step 146, and direction LED 76 can remain green for a successful transfer, or red for a failure of some kind, such as the user removing the flash card too soon.

ALTERNATE EMBODIMENTS

Several other embodiments are contemplated by the inventors. For example a liquid crystal display (LCD) could be added to the flash-card exchanger. Text messages could appear on the LCD. Additional or fewer LED's and buttons could be used. The direction select buttons could be two separate buttons, a single rocker switch or button, or a single button that toggles the selected direction. When the LCD is provided, all five LEDs, fewer LED's, or no LEDs could be provided. Some or all of the LEDs could be multi-color LEDs. Normal operation can be indicated by green and errors by red. When yellow is also available, it can be used to prompt the user to do something, such as press the GO button.

A third USB connector for a second USB-memory key drive could be added, or data could be copied to a second USB-memory key drive that is inserted in the same USB connector after the first USB-memory key drive fills up. The USB connectors for the cable to the host PC and for the USB-memory key drive can be of different types. In the host PC card-reader mode, the USB memory key drive, acting as a peripheral like other flash memory card, can be read by the host PC. The disk format supported inside the flash storage exchanger may include those for Windows, Unix and Apple platforms. The disk format could be: File-Allocation Table (FAT), FAT32, New Technology File System (NTFS), Second Extended File System (Ext2), Third Extended File System (Ext3), Hierarchical File System (HFS), and Universal File System (UFS).

A direct-memory access (DMA) engine could be added to USB dual-mode microcontroller 30 to facilitate data transfers. An updateable memory such as an EEPROM could be added to the internal bus, allowing the firmware to be updateable. A default direction could be defined, such as READ, so that the user could simply press the GO button for READ, but has to press a select button for WRITE. Rather than use USB, other serial interfaces could be substituted for either the connection to host PC 10 or for USB-memory key drive 16, such as PCI Express, Express-Card, Firewire (IEEE 1394), serial ATA, serial attached small-computer system interface (SCSI), etc.

The microcontroller and components such as the serial engine, DMA, GPIO, and other controllers and functions can be implemented in a variety of ways. Functions can be programmed and executed by the CPU or other processor, or can be implemented in dedicated hardware, firmware, or in some combination. Many partitionings of the functions can be substituted. The programs can have additional loops, sub-routines, and links that are not shown in the simple examples. For example, insertion of another card, USB-memory key drive, or the host cable could cause the main program flow to jump back to the start to allow for re-configuration. These jumps are not shown in the flowcharts because of their complexity and the desire to explain a simplified and more understandable program flow. Error routines can be added, such as for when the user pressed the wrong button, such as the GO button before the removable flash card is inserted.

The host PC or USB dual-mode microcontroller 30 can transfer standard USB packets to the serial engine during a transaction, such as a token, data, and handshake packet. Other packet types or variations of these types can be defined for special purposes. These packets may include a control-program-request packet, a control-program-reply packet, a flash-memory-request packet, and a flash-memory-reply packet. The flash-memory request/reply packets may further include the following request/reply packet pairs: flash ID, read, write, erase, copy-back, reset, page-write, cache-write and read-status.

Alternate bus architectures with nested or segmented buses could be used internal or external to the microcontroller. Two or more internal buses can be used in USB dual-mode microcontroller 30 to increase throughput. More complex switch fabrics can be substituted for the internal buses.

The user can expand the available memory simply by plugging in a larger-capacity USB-memory key drive. Since memory prices tend to drop with time, the user could initially use a smaller-capacity USB-memory key drive and a year or two later buy a larger-capacity USB-memory key drive. Thus the user can easily expand the storage capacity on demand.

The flash-card exchanger is very easy to operate. The user simply plugs the USB-memory key drive into the USB connector, plugs the removable flash-memory card into the matching slot, and presses the GO button to copy files to the USB-memory key drive. The USB-memory key drive can later be plugged into a standard USB connector on a host PC and the files copied to the PC. Alternately, the flash-card exchanger can be plugged into a host PC and the files copied from the flash cards. The flash-card exchanger could take power from the host PC when connected, or use the battery or and external AC/DC adapter. The battery could be disposable or rechargeable. Eliminating an internal hard disk improves reliability since the moving disk is prone to failure.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A flash-card reader and exchanger comprising:
   a first serial-bus connector for receiving a serial cable connected to a host computer that acts as a serial-bus host;
   a second serial-bus connector for receiving a serial-bus flash-memory drive;
   a serial bus connected to the first and second serial-bus connectors;
   an input-output bus;
   a dual-mode microcontroller coupled to the serial bus and coupled to the input-output bus, for operating in a card-reader mode and responding as a serial-bus peripheral to requests from the host computer when the host computer is connected, but for operating in an exchanger mode and originating data transfers as a local host of the serial bus when the host computer is not connected to the first serial-bus connector;
   a flash-card interface for receiving a removable flash-memory card, the flash-card interface connected to the input-output bus; and
   an exchanger program, executed by the dual-mode microcontroller, for reading data from the removable flash-memory card over the input-output bus to the dual-mode microcontroller, and for writing data over the serial bus to the serial-bus flash-memory drive, when the dual-mode microcontroller is operating in the exchanger mode,
   whereby the flash-card reader and exchanger operates in the card-reader mode when the host computer is connected, but operates in the exchanger mode, originating data transfers as a local host, when the host computer is not connected.

2. The flash-card reader and exchanger of claim 1 wherein the serial bus is a PCI Express bus, an Express-Card bus, a Firewire (IEEE 1394) bus, a serial ATA bus, or a serial attached small-computer system interface (SCSI) bus.

3. The flash-card reader and exchanger of claim 1 wherein the serial bus is a Universal-Serial-Bus (USB).

4. The flash-card reader and exchanger of claim 3 wherein the dual-mode microcontroller is a USB On-the-Go controller or a USB reduced-function host controller acting as a USB host when not connected to the host computer, but acting as a USB peripheral when connected to the host computer.

5. The flash-card reader and exchanger of claim 3 wherein the dual-mode microcontroller comprises:
   a serial interface to a serial bus that connects to a host;
   a serial engine for detecting and processing packets sent over the serial bus;
   a serial-engine buffer for storing data sent over the serial bus;
   an internal bus coupled to the serial-engine buffer;
   a random-access memory (RAM) for storing instructions for execution, the RAM on the internal bus;
   a central processing unit, on the internal bus, the CPU accessing and executing instructions in the RAM; and
   an input-output controller, on the internal bus, for communicating with the input-output bus.

6. The flash-card reader and exchanger of claim 5 further comprising:
   an indicator lamp for indicating when data is being transferred by the dual-mode microcontroller; and
   a user-activated button for initiating data transfer,
   wherein the indicator lamp and the user-activated button are connected to the input-output bus.

7. The flash-card reader and exchanger of claim 6 wherein the indicator lamp comprises:
   a first direction lamp that indicates when the removable flash-memory card is to be read;
   a second direction lamp that indicates when the removable flash-memory card is to be written;
   a card-reader mode lamp that indicates when the dual-mode microcontroller is operating in the card-reader mode; and
   an exchanger mode lamp that indicates when the dual-mode microcontroller is operating in the exchanger mode.

8. The flash-card reader and exchanger of claim 7 wherein the indicator lamp comprises at least one multi-color light-emitting diode (LED).

9. The flash-card reader and exchanger of claim 7 further comprising:
   a card insertion lamp that indicates when the removable flash-memory card has been properly inserted into the flash-card interface.

10. The flash-card reader and exchanger of claim 6 wherein the removable flash-memory card is a compact-flash card, a smart-media flash-card, a secure-digital/multi-media card, or a memory stick.

11. The flash-card reader and exchanger of claim 10 further comprising:
a flash-integrated memory module, coupled to the input-output bus; and
a liquid crystal display (LCD), coupled to the input-output bus.

12. The flash-card reader and exchanger of claim 6 wherein the exchanger program further comprises:
a main control program that waits for insertion of the removable flash-memory card and activates the exchanger mode when the host computer is not connected to the serial bus, but activates the card-reader mode when the host computer is not connected to the serial bus.

13. The flash-card reader and exchanger of claim 12 further comprising:
a flash-exchanger program, activated by the main control program when operating in the exchanger mode, the flash-exchanger program causing the dual-mode microcontroller to read data from the removable flash-memory card over the input-output bus, the flash-exchanger program causing the dual-mode microcontroller to send data to the serial-bus flash-memory drive as serial-bus packets;
wherein the flash-exchanger program means includes means for reading a disk format of data, the disk format being File-Allocation Table (FAT), FAT32, New Technology File System (NTFS), Second Extended File System (Ext2), Third Extended File System (Ext3), Hierarchical File System (HFS), and Universal File System (UFS).

14. A user-expandable flash-card exchanger comprising:
a local Universal-Serial-Bus (USB) segment;
a host USB connector for connecting the local USB segment to a host computer that executes a USB host program to originate USB transfers;
a second USB connector for receiving a USB-memory key drive, the USB-memory key drive having a flash memory for storing data from USB packets sent over the local USB segment;
a USB dual-mode microcontroller, having a serial engine connected to the local USB segment, for executing a USB peripheral-mode program to respond to USB requests from the host computer during a peripheral mode, and for executing a local-host program to initiate data transfers when the host computer is not connected;
an input-output bus, driven by the USB dual-mode microcontroller, for transferring data, addresses, and commands;
a flash-card connector, coupled to the input-output bus, for receiving a removable flash-memory card;
wherein the USB dual-mode microcontroller reads data from the removable flash-memory card over the input-output bus by sending flash-memory commands to the removable flash-memory card;
an indicator on the input-output bus, for indicating operating status to a user; and
a user-input device on the input-output bus, for receiving an input from the user,
whereby the USB dual-mode microcontroller operates as a USB peripheral when the host computer is attached, but executes the local-host program when the host computer is not connected.

15. The user-expandable flash-card exchanger of claim 14 wherein the removable flash-memory card is a compact-flash card, a smart-media flash-card, a secure-digital/multi-media card, or a memory stick.

16. The user-expandable flash-card exchanger of claim 15 further comprising:

a second flash-card connector, for receiving a second type of removable flash-memory card that is a different type of removable flash-memory card that received by the flash-card connector,
whereby at least two different types of the removable flash-memory card can be read.

17. The user-expandable flash-card exchanger of claim 14 wherein the USB dual-mode microcontroller comprises:
an internal bus;
a central processing unit, coupled to the internal bus, for executing instructions;
a local program memory for storing program code executed by the central processing unit including the USB peripheral-mode program and the local-host program; an input-output controller, coupled to the internal bus and to the input-output bus; and
wherein the serial engine comprises a serial interface to the local USB segment, and a serial-engine buffer, coupled to the internal bus, for storing data sent over the local USB segment.

18. A flash-card exchanger comprising:
dual-mode microcontroller means for executing control programs;
a Universal-Serial-Bus (USB) connected to the dual-mode microcontroller means;
first connector means, coupled to the USB, for receiving a USB-memory key drive that stores data contained in USB packets in response to USB requests;
second connector means, coupled to the USB, for connecting to an external USB host that originates USB requests to the dual-mode microcontroller means;
input-output bus means, controlled by the dual-mode microcontroller means;
first flash interface means, connected to the input-output bus means, for interfacing to a removable flash-memory card;
indicator means, connected to the input-output bus means, for indicating a status to a user in response to the dual-mode microcontroller means;
activating-input means, connected to the input-output bus means, for receiving an input from the user, the activating-input means sending a user-activating signal to the dual-mode microcontroller means;
main control program means, executed by the dual-mode microcontroller means, for detecting insertion of the removable flash-memory card, for detecting connection of the USB-memory key drive to the first connector means, and for detecting connection of the external USB host to the second connector means, for activating a USB peripheral mode when the external USB host is connected, but for activating a local-host mode when the external USB host is not connected, but the USB-memory key drive is connected, the main control program means causing the indicator means to display a mode status indicating the USB peripheral mode or the local-host mode;
wherein the external USB host reads data from the removable flash-memory card through the dual-mode microcontroller means when operating in the USB peripheral mode; and
flash-exchanger program means, executed by the dual-mode microcontroller means when operating in the local-host mode and the user-activating signal is received from the activating-input means, for blinking the indicator means and transferring data between the removable flash-memory card and the USB-memory key drive without an external USB host,
whereby the flash-exchanger program means operates when the external USB host is not connected.

19. The flash-card exchanger of claim 18 further comprising:
  second flash interface means, connected to the input-output bus means, for interfacing to a second type of removable flash-memory card.

20. The flash-card exchanger of claim 18 wherein the indicator means comprises:
  a first light-emitting diode (LED) that is lit when the removable flash-memory card is inserted into the first flash interface means;
  a second LED that is lit when the USB-memory key drive is connected to the first connector means and the external USB host is not connected to the second connector means;
  a third LED that is lit when the external USB host is connected to the second connector means; and
  a direction LED that is lit to indicate a direction of data transfer.

* * * * *